United States Patent
Petrov-Savchenko et al.

(10) Patent No.: US 10,064,150 B2
(45) Date of Patent: Aug. 28, 2018

(54) APPARATUS AND METHOD FOR SYNTONIZED STREAMING

(71) Applicant: MOTOROLA SOLUTIONS, INC., Chicago, IL (US)

(72) Inventors: Aleksandr Leonidovich Petrov-Savchenko, St. Petersburg (RU); Aleksei Aleksandrovich Khomich, St. Petersburg (RU)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 15/524,991

(22) PCT Filed: Apr. 1, 2016

(86) PCT No.: PCT/RU2016/000185
§ 371 (c)(1),
(2) Date: May 5, 2017

(87) PCT Pub. No.: WO2017/171577
PCT Pub. Date: Oct. 5, 2017

(65) Prior Publication Data
US 2018/0084512 A1    Mar. 22, 2018

(51) Int. Cl.
*H04W 56/00* (2009.01)
*H04S 7/00* (2006.01)
*H04S 1/00* (2006.01)

(52) U.S. Cl.
CPC ......... *H04W 56/0015* (2013.01); *H04S 1/007* (2013.01); *H04S 7/30* (2013.01); *H04R 2420/07* (2013.01)

(58) Field of Classification Search
CPC ...... H04R 5/04; H04R 2420/07; H04R 5/033; H04S 1/00; H04S 7/30; H04S 1/007;
(Continued)

(56) References Cited

U.S. PATENT DOCUMENTS

2006/0153155 A1    7/2006 Jacobsen et al.
2006/0235552 A1*  10/2006 Manis ............... H04B 3/54
                                                  700/94
(Continued)

FOREIGN PATENT DOCUMENTS

JP    2001-275194    10/2001
WO    2013041829    3/2013

OTHER PUBLICATIONS

PCT/RU2016/000185 International Search Report and Written Opinion of the International Searching Authority dated Jan. 12, 2017 (9 pages).

(Continued)

*Primary Examiner* — Melur Ramakrishnaiah
(74) *Attorney, Agent, or Firm* — Michael Best & Friedrich LLP

(57) ABSTRACT

An apparatus and method for syntonized streaming. One embodiment provides a digital streaming device for syntonized streaming. The digital streaming device also includes a first data channel and a second data channel that communicate a data stream. The digital streaming device further includes a clock comparator electrically coupled to the reference clock and configured to receive the reference clock signal. The clock comparator is also configured to receive a first feedback signal for the first data channel and a second feedback signal for the second data channel. The clock comparator is further configured to generate a first syntonization signal based on the first feedback signal and the second feedback signal. The digital streaming device also includes a first resampling circuit electrically coupled to the clock comparator and configured to adjust a first sample rate of the first data channel based on the first syntonization signal.

14 Claims, 7 Drawing Sheets

(58) Field of Classification Search
CPC .......... H04W 56/0015; G11B 20/10222; H04J 3/0658; H04J 3/12
USPC .................. 700/94; 381/79, 81, 77; 455/430
See application file for complete search history.

(56) References Cited

U.S. PATENT DOCUMENTS

2009/0298420 A1* 12/2009 Haartsen ............... H04J 3/0658
455/3.06
2012/0224712 A1 9/2012 Shiba

OTHER PUBLICATIONS

Reis et al., "Synchronization and Syntonization of Wireless Sensor Networks," IEEE 1588 Protocol (2013) pp. 151-153, Portugal.

* cited by examiner

APPARATUS AND METHOD FOR SYNTONIZED STREAMING

BACKGROUND OF THE INVENTION

A multi-speaker wireless audio system uses a media source to transmit data to multiple speakers over a wireless network. The speakers each receive a digital data stream over the wireless network and convert the digital data stream to an analog audio output. Based on variations in the speakers and the data conversion rates, the audio output by the speakers may be out of synchronization. The audio quality of the audio output by the multiple speakers is reduced when out of synchronization.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
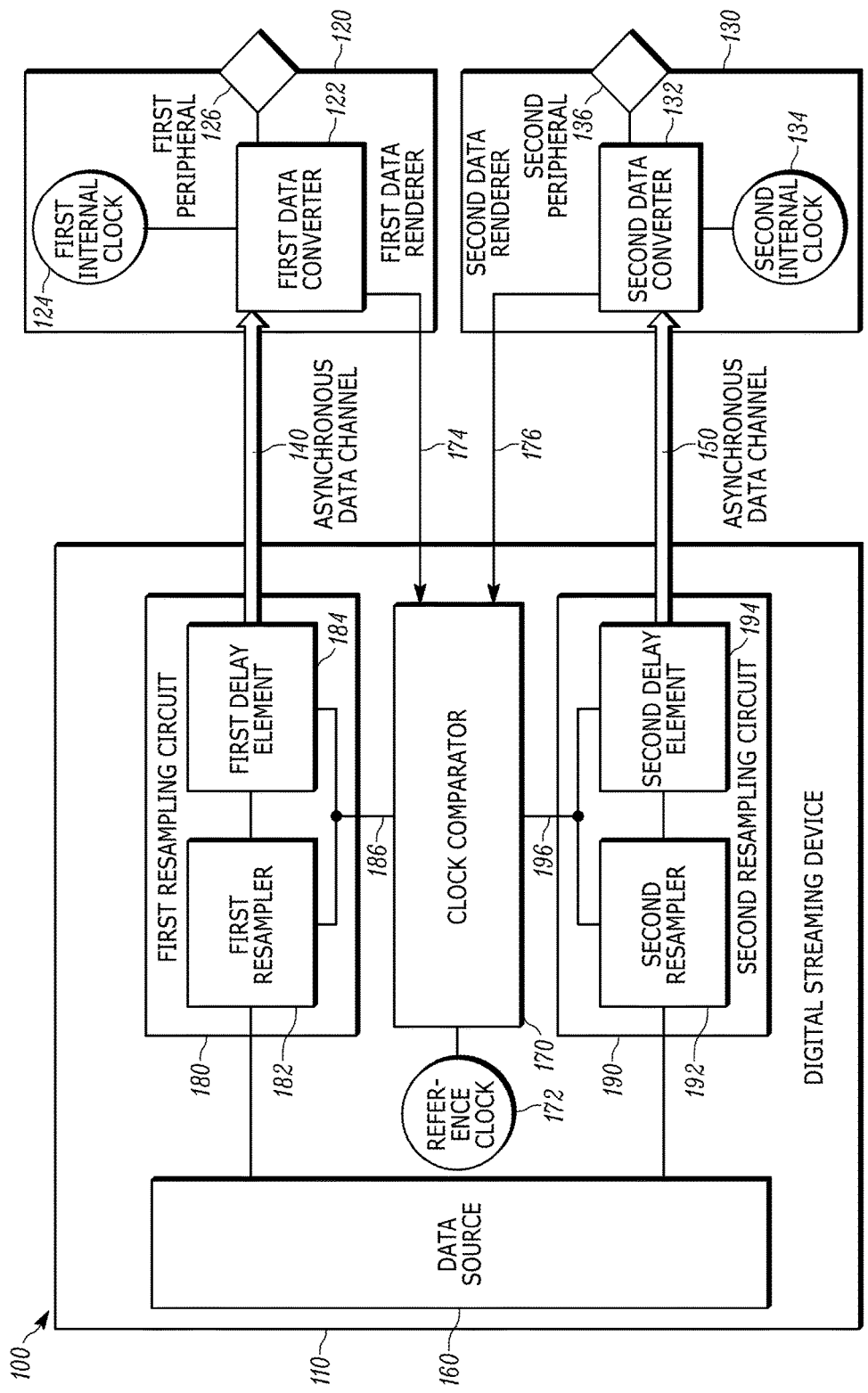
FIG. 1 is a block diagram of a digital streaming system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a digital streaming device for syntonized streaming including a reference clock that generates a reference clock signal. The digital streaming device also includes a first data channel and a second data channel that communicate a data stream. The digital streaming device further includes a clock comparator electrically coupled to the reference clock and configured to receive the reference clock signal. The clock comparator is also configured to receive a first feedback signal for the first data channel and a second feedback signal for the second data channel. The clock comparator is further configured to generate a first syntonization signal based on the first feedback signal and the second feedback signal. The digital streaming device also includes a first resampling circuit electrically coupled to the clock comparator and configured to adjust a first sample rate of the first data channel based on the first syntonization signal.

Another embodiment provides a method for syntonized streaming of data from a data source including transmitting a data stream at a first data channel and a second data channel. The method also includes receiving, by a clock comparator, a reference clock signal from a reference clock. The method further includes receiving, by the clock comparator, a first feedback signal from the first data channel and a second feedback signal from the second data channel. The method also includes generating, by the clock comparator, a first syntonization signal based on the first feedback signal and the second feedback signal. The method further includes adjusting, using a first resampling circuit, a first sample rate of the first data channel based on the first syntonization signal.

FIG. 1 is a block diagram of a digital streaming system 100. In some embodiments, the digital streaming system 100 may be a multi-speaker wireless audio system. In the example illustrated, the digital streaming system 100 includes a digital streaming device 110 communicating with a first data renderer 120 and a second data renderer 130 over a first asynchronous data channel 140 and a second asynchronous data channel 150, respectively. It should be understood that FIG. 1 illustrates only an exemplary embodiment of a digital streaming system 100 and that the digital streaming system 100 may include more or less components and may perform additional functions other than those described herein. For example, the digital streaming system 100 may communicate with more than two data renderers.

The first data renderer 120 includes a first data converter 122, a first internal clock 124, and a first peripheral 126. The first data renderer 120 receives data from the digital streaming device 110 over the first asynchronous data channel 140 and converts the data to be output at the first peripheral 126. It should be understood that the first data renderer 120 may include more or less components and may perform additional functions other than those described herein.

In some embodiments, the first data converter 122 is a digital-to-analog converter and converts digital data received from the digital streaming device 110 to analog output data that can be output at the first peripheral 126. For example, the first peripheral 126 may be a speaker and the first data converter 122 outputs an analog audio signal at the speaker.

The first internal clock 124 provides a clock signal for the operation of the first data converter 122. The first data converter 122 includes a buffer overflow pin (for example, a first buffer overflow pin) that outputs a first feedback signal 174 when a buffer threshold event occurs. That is, the first feedback signal 174 from the buffer overflow pin indicates when a complete word (or other selected unit) of an input signal is received and/or processed by the first data converter 122 or the first data renderer 120. For example, assuming Fs1 is the frequency of the first internal clock 124 and N1 (bits) is the first buffer length of the first data renderer 120, then the first feedback signal 174 output by the buffer overflow pin is a waveform indicating frequency Fs1 of the first internal clock 124 divided by the first buffer length N1 of the first data renderer 120. Although the first internal clock 124 and the first peripheral 126 are shown as separate components, it should be understood that, in some embodiments, these components may be included within the first data converter 122.

The second data renderer 130 includes a second data converter 132, a second internal clock 134, and a second peripheral 136. The second data renderer 130 and its components may be similar to the first data renderer 120 and the components of the first data renderer 120. The second data renderer 130 receives data from the digital streaming device 110 over the second asynchronous data channel 150 and converts the data to be output at the second peripheral 136. Similar to the buffer overflow pin of the first data converter 122, the second data converter 132 includes a buffer overflow pin (for example, a second buffer overflow pin) that outputs a second feedback signal 176 that is a waveform indicating frequency Fs2 of the second internal clock 134 divided by the second buffer length N2 of the second data renderer 130. It should be understood that the second data renderer 130 may include more or less components and may perform additional functions other than those described herein.

The digital streaming device 110 includes a data source 160, a clock comparator 170, a first resampling circuit 180, and a second resampling circuit 190. The first resampling circuit 180 includes a first resampler 182 and a first delay element 184. The first resampling circuit 180 resamples data from the data source 160 and transmits the data to the first data renderer 120 over the first asynchronous data channel 140. The second resampling circuit 190 includes a second resampler 192 and a second delay element 194. The second resampling circuit 190 resamples data from the data source 160 and transmits the data to the second data renderer 130 over the second asynchronous data channel 150. It should be understood that the digital streaming device 110 may include more or less components and may perform additional functions other than those described herein. For example, the digital streaming device 110 may include more than two resampling circuits, such as when the digital streaming device 110 is communicating with more than two data renderers. In some embodiments, the data source 160 may not be included in the digital streaming device 110. The digital streaming device 110 may include a data buffer to receive and temporarily store data received from an external data source 160.

The clock comparator 170 receives a reference clock signal from a reference clock 172. The reference clock signal from the reference clock 172 defines a sampling rate at which the clock comparator 170 operates. The clock comparator 170 receives the first feedback signal 174 from the first buffer overflow pin of the first data converter 122 and the second feedback signal 176 from the second buffer overflow pin of the second data converter 132. The clock comparator 170 outputs resampling factors to the first resampling circuit 180 and the second resampling circuit 190 based on the first feedback signal 174 and the second feedback signal 176.

The digital streaming device 110, the first data renderer 120, and the second data renderer 130 communicate over a communication network. The communication network may include a local area network (LAN), a neighborhood area network (NAN), a home area network (HAN), or a personal area network (PAN) employing various communication protocols, such as Wi-Fi™, Bluetooth®, Zigbee®, and the like. The first asynchronous data channel 140 and the second asynchronous data channel 150 may be dedicated channels within the communication network that transmit data asynchronously between the respective resampling circuits and data converters. In some embodiments, the feedback signals (that is, the first feedback signal 174 and the second feedback signal 176) are transmitted within the first asynchronous data channel 140 and the second asynchronous data channel 150, respectively, rather than over a separate communication channel. Although not illustrated, digital streaming device 110, the first data renderer 120, and the second data renderer 130 each include a known wireless communication circuit enabling the transmission and receipt of data, such as over the communication channels 140 and 150, as discuss herein.

Figure 2:
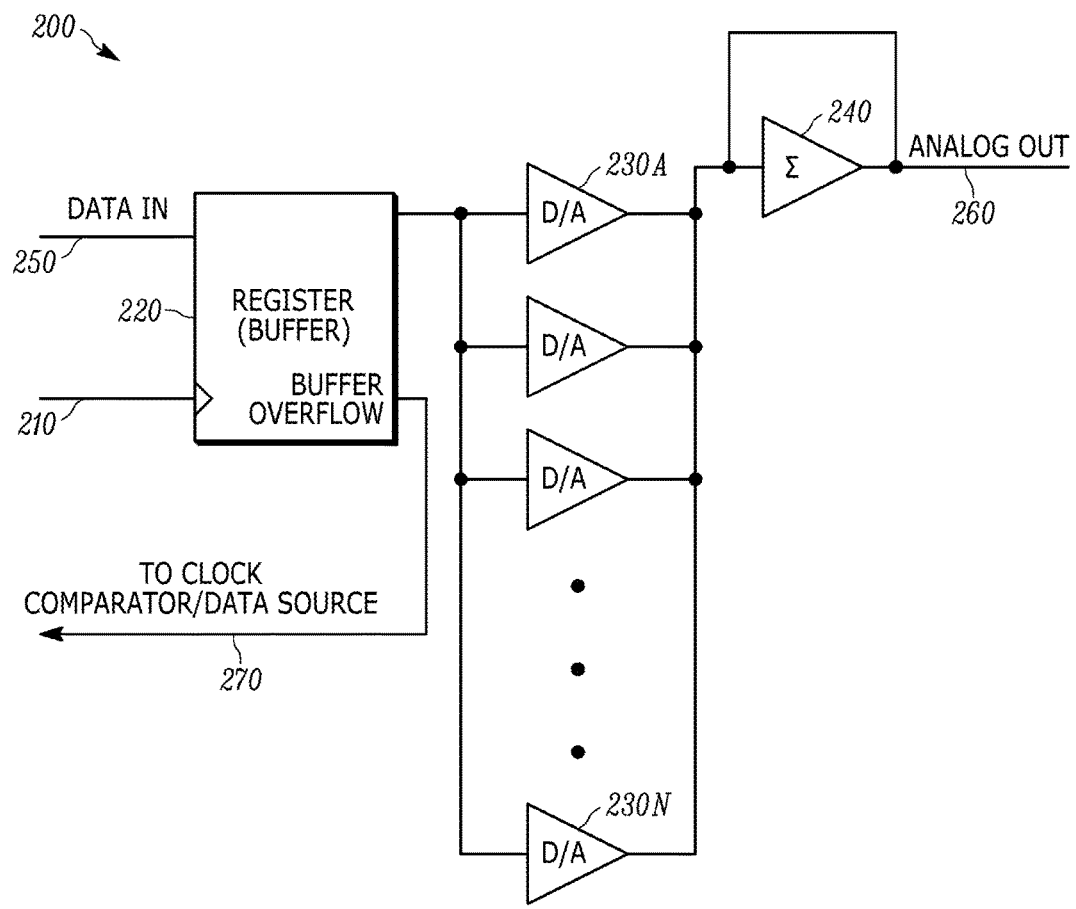
FIG. 2 is a block diagram of a data converter in accordance with some embodiments.

FIG. 2 is a block diagram of a data converter 200. In some embodiments, the first data converter 122 and the second data converter 132 are configured to have features of the data converter 200. In the illustrated example, the data converter 200 includes an internal clock input 210, a register 220, element converters 230A through 230 N, an operational amplifier 240, a data input 250, an analog output 260, and a buffer overflow pin 270. It should be understood that FIG. 2 illustrates only an exemplary embodiment of a data converter 200 and that the data converter 200 may include more or less components and may perform additional functions other than those described herein.

The internal clock input 210 provides a clock signal for operation of the data converter 200. In some embodiments, the internal clock input 210 is received from an internal clock of a data renderer, such as the first internal clock 124 or the second internal clock 134. The data input 250 is received from a digital streaming device (for example digital streaming device 110 of FIG. 1) over an asynchronous data channel. The analog output 260 is output to a peripheral of a data renderer, such as the first peripheral 126 or the second peripheral 136.

The register 220 continuously receives and stores data received via the data input 250. When a complete word is received from the data input 250, the register 220 outputs the word as a digital signal to each of the element converters 230A through 230 N. Additionally, the register 220 outputs an indication via the buffer overflow pin 270 when a complete word is received at the register 220.

The element converters 230A through 230N receive the digital output signals from register 220. The element converters 230A through 230N convert the digital signals and output a corresponding analog signal to the operational amplifier 240. The output of the element converters 230A through 230N is summed at the operational amplifier 240 to form the analog signal, which represents the digital input signal received at the data input 250. The analog signal is output at the analog output 260.

Figure 3:
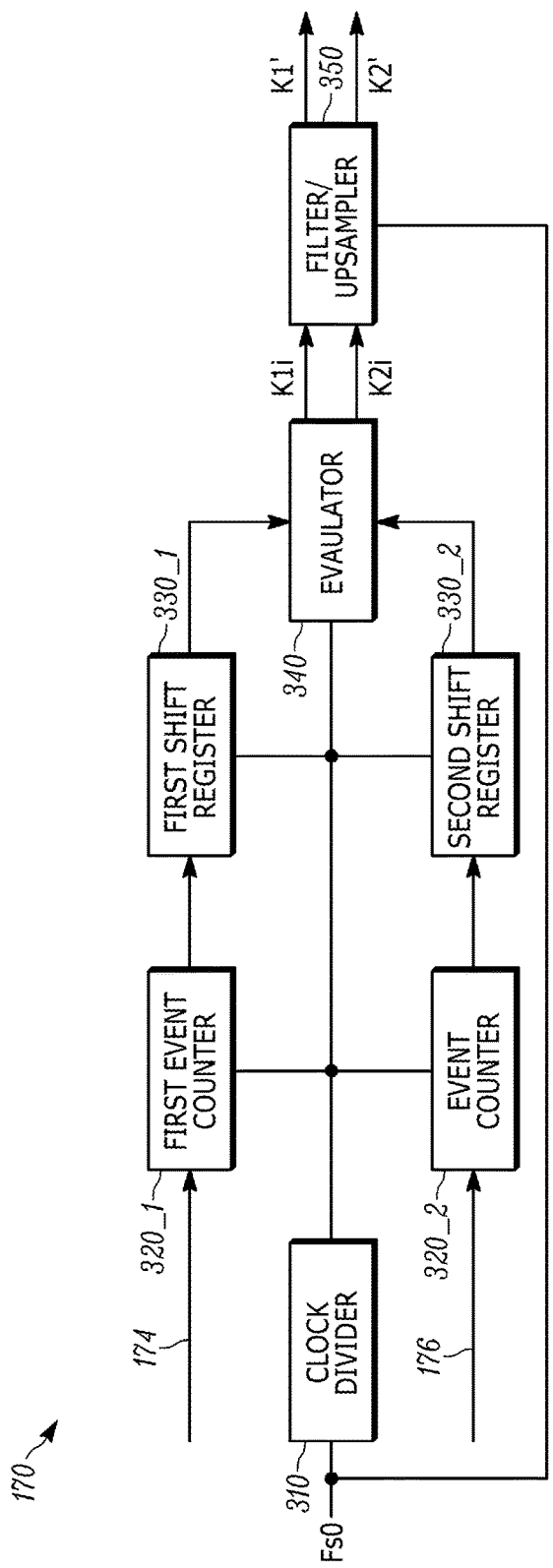
FIG. 3 is a block diagram of a clock comparator in accordance with certain embodiments.

FIG. 3 is a block diagram of the clock comparator 170. In the illustrated example, the clock comparator 170 includes a clock divider 310, a first event counter 320_1, a second event counter 320_2, a first shift register 330_1, a second shift register 330_2, an evaluator 340, and an optional filter/upsampler 350. It should be understood that FIG. 3 illustrates only an exemplary embodiment of a clock comparator 170 and that the clock comparator 170 may include more or less components and may perform additional functions other than those described herein.

The clock divider 310 receives the reference clock signal Fs0 from the reference clock 172 and outputs a clock divider signal providing measurement intervals ti. The clock divider 310 provides measurement intervals ti to the first event counter 320_1, the second event counter 320_2, the first shift register 330_1, the second shift register 330_2, and the evaluator 340.

The first event counter 320_1 receives the first feedback signal 174 from the first data renderer 120 (shown in FIG. 1). The second event counter 320_2 receive the second feedback signal 176 from the second data renderer 130 (shown in FIG. 1). The first event counter 320_1 and the second event counter 320_2 also receive the output of the clock divider 310. The first event counter 320_1 outputs the number of first data renderer 120 events to the first shift register 330_1. Similarly, the second event counter 320_2 outputs the number of second data renderer 130 events to the second shift register 330_2.

The first shift register 330_1 receives and stores the number of events from the first event counter 320_1 for each time interval ti over a time period T. For each time interval ti, the first shift register 330_1 outputs the sum of all number of events for time intervals ti to ti-T to the evaluator 340. Similarly, the second shift register 330_2 receives and stores the number of events from the second event counter 320_2 for each time interval ti over the time period T. For each time interval ti, the second shift register 330_2 outputs the sum of all number of events for time intervals ti to ti-T to the evaluator 340. In some embodiments, the clock comparator 170 includes additional counters within or connected to the first shift register 330_1 and the second shift register 330_2 to count or sum the events stored in the first shift register 330_1 and the second shift register 330_2. The output of the additional counters is provided to the evaluator 340.

The evaluator 340 calculates a first resampling factor K1$i$ and a second resampling factor K2$i$ for each measurement interval ti based on the summarized events received from the first shift register 330_1 and the second shift register 330_2. The evaluator 340 also generates a first phase adjuster φ1$i$ and a second phase adjuster φ2$i$ for each measurement interval ti based on the summarized events received from the first shift register 330_1 and the second shift register 330_2. The first resampling factor K1$i$ and the first phase adjuster φ1$i$ form a first syntonization signal S1$i$. Similarly, the second resampling factor K2$i$ and the second phase adjuster φ2$i$ form a second syntonization signal S2$i$. The first syntonization signal S1$i$ and the second syntonization signal S2$i$ are provided to the filter/upsampler 350.

The filter/upsampler 350 is included in the clock comparator 170 to provide a first syntonization signal S1' to the first resampling circuit 180 and to provide a second syntonization signal S2' to the second resampling circuit 190 over the first factor line 186 and the second factor line 196, respectively. The filter/upsampler 350 may use approximation, kalman-like filter, or both to upsample the first resampling factor K1$i$ to a first resampling factor K1' with a rate equal to Fs0. The filter/upsampler 350 may also alter the first phase adjuster φ1$i$ to first phase adjuster φ1'. The first syntonization signal S1' includes the first resampling factor K1' and the first phase adjuster φ1'. Similarly, the filter/upsampler 350 may use approximation, kalman-like filter to upsample the second resampling factor K2$i$ to the second resampling factor K2' with a rate equal to Fs0. The filter/upsampler 350 may also alter the second phase adjuster φ2$i$ to second phase adjuster φ2'. The second syntonization signal S2' includes the second resampling factor K2' and the second phase adjuster φ2' In some embodiments, the clock comparator 170 provides the first syntonization signal S1$i$ to the first resampling circuit 180 and the second syntonization signal S2$i$ to the second resampling circuit 190 directly.

Figure 4:
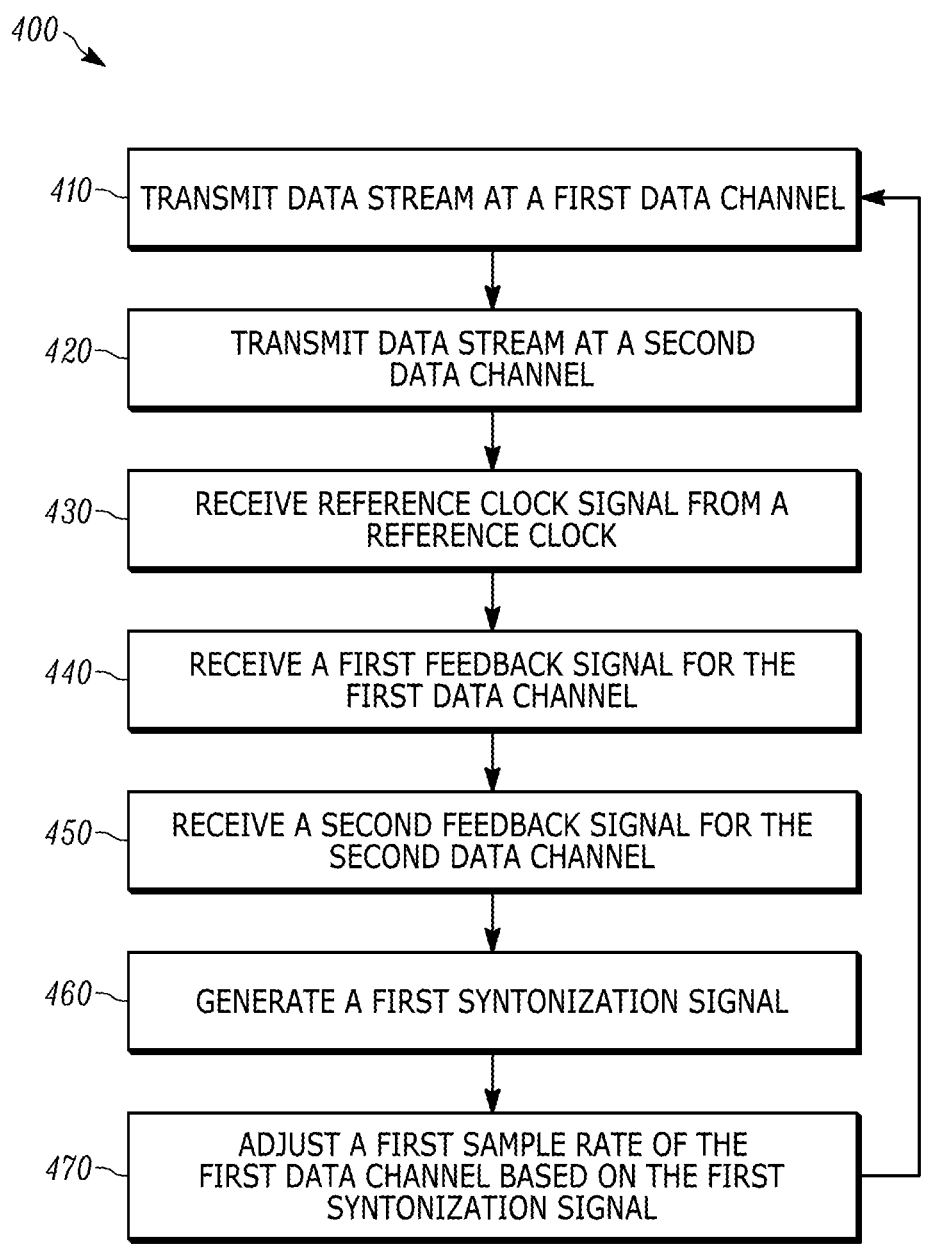
FIG. 4 is a flowchart of a method for syntonized streaming in accordance with some embodiments.

FIG. 4 is a flowchart illustrating an exemplary method 400 for syntonized streaming of data from the digital streaming device 110. As illustrated in FIG. 4, the digital streaming device 110 transmits a data stream at a first asynchronous data channel 140 (block 410) and transmits the data stream at a second asynchronous data channel 150 (block 420). The data stream is received by the first data renderer 120 over the first asynchronous data channel 140 and the second data renderer 130 over the second asynchronous data channel 150, which convert the data stream to analog output and render the analog output.

The clock comparator 170 receives the reference clock signal from the reference clock 172 (at block 430). As described above, the reference clock signal provides a sampling rate at which the clock comparator 170 operates.

The clock comparator 170 also receives the first feedback signal 174 (Fs1/N1) for the first asynchronous data channel 140 (block 440) from the buffer overflow pin of the first data converter 122 and the second feedback signal 176 (Fs2/N2) for the second asynchronous data channel 150 (block 450) from the buffer overflow pin of the second data converter 132. As described above, the feedback signals indicate when a complete word is received and/or processed by the data renderer.

The clock comparator 170 generates a first syntonization signal S1$i$ based on the first feedback signal 174 and the second feedback signal 176 (block 460). An exemplary method of generating the first resampling factor K1$i$ of the first syntonization signal S1$i$ is described with respect to FIG. 5 below. The first resampling circuit 180 adjusts a first sample rate of the data stream over the first asynchronous data channel 140 based on the first syntonization signal S1$i$ (block 470). Adjusting the first sample rate of the data stream may include, for example, multiplying the first sample rate with the first resampling factor K1$i$ and introducing a phase delay by the amount represented by the first phase adjuster φ1$i$. The process continues to block 410 to receive the next iteration of feedback signals to continuously syntonize the first data renderer 120 and the second data renderer 130.

In some embodiments, the clock comparator 170 also generates a second syntonization signal S2$i$ based on the first feedback signal 174 and the second feedback signal 176. An exemplary method of generating the second resampling factor K2$i$ of the second syntonization signal S2$i$ is described with respect to FIG. 5 below. The second resampling circuit 190 adjusts a second sample rate of the data stream over the second asynchronous data channel 150 based on the second syntonization signal S2$i$. Adjusting the second sample rate of the data stream may include, for example, multiplying the second sample rate with the second resampling factor K2$i$ and introducing a phase delay by the amount represented by the second phase adjuster φ2$i$.

Figure 5:
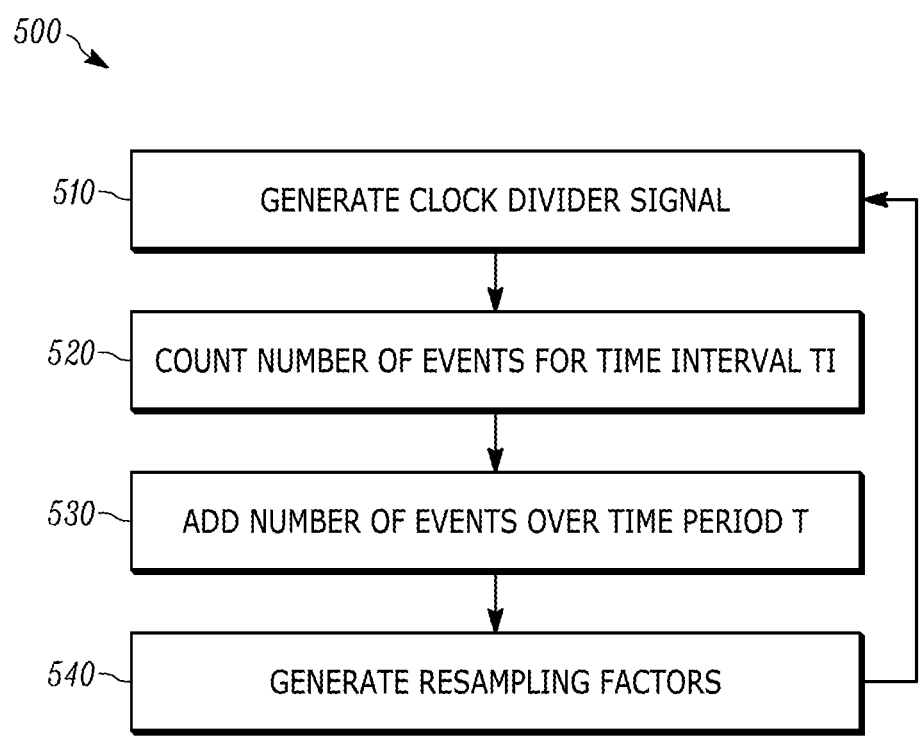
FIG. 5 is a flowchart of a method of generating a syntonization signal in accordance with some embodiments.

FIG. 5 is a flowchart illustrating an exemplary method 500 for generating syntonization signals by the clock comparator 170. As illustrated in FIG. 5, the clock comparator 170 first generates a clock divider signal (block 510). The clock divider 310 divides the reference clock signal Fs0 from the reference clock 172 by the buffer length N0 of the digital streaming device 110. The clock divider 310 provides the clock divider signal to the first event counter 320_1, the second event counter 320_2, the first shift register 330_1, the second shift register 330_2, and the evaluator 340. The clock divider 310 signal provides measurement intervals ti for the operation of the components of the clock comparator 170. In some embodiments, the buffer length N0 of the digital streaming device is equal to the first buffer length N1 and the second buffer length N2.

At block 520, the clock comparator 170 counts the number of events in the first feedback signal 174 and the second feedback signal 176. As described above, the first feedback signal 174 is received at the first event counter 320_1 and the second feedback signal 176 is received at the second event counter 320_2. The first event counter 320_1 counts the number of events that occur for each measurement interval ti in the first feedback signal 174 and outputs the number of events to the first shift register 330_1. Similarly, the second event counter 320_2 counts the number of events that occur for each measurement interval ti in the second feedback signal 176 and outputs the number of events to the second shift register 330_2.

At block 530, the clock comparator 170 adds the number of events over a time period T stored in the first shift register 330_1 and the second shift register 330_2. The first shift register 330_1 receives the number of events of the first data renderer 120 for each measurement interval ti from the first event counter 320_1. The first shift register 330_1 stores this number of events for a time period T, where T is a whole number multiple of measurement interval ti. The first shift register 330_1 adds the number of events received over the time period T to arrive at a sum referred to as a first number of events. That is, the first shift register 330_1 adds the number of events for each of the measurement intervals ti−T to ti to calculate the first number of events. The output of the first shift register 330_1 is represented as $$\sum_{ti-T}^{ti}\left(\frac{Fs1}{N1}\right),$$

where Fs1/N1 is the first feedback signal 174 received from the first data renderer 120.

Similarly, the second shift register 330_2 receives the number of events of the second data renderer 130 for each measurement interval ti. The second shift register 330_2 stores this number of events for the time period T. The second shift register 330_2 adds the number of events over the time period T to arrive at a sum referred to as a second number of events. That is, the second shift register 330_2 adds the number of events for each of the measurement intervals ti−T to ti to calculate the second number of events. The output of the second shift register 330_2 is represented as $$\sum_{ti-T}^{ti}\left(\frac{Fs2}{N2}\right),$$

where Fs2/N2 is the second feedback signal 176 received from the second data renderer 130. The first shift register 330_1 and the second shift register 330_2 provide their outputs to the evaluator 340.

At block 540, the clock comparator 170 generates resampling factors for the first resampling circuit 180 and the second resampling circuit 190. As described above, the evaluator 340 receives the number of first data renderer 120 events from the first shift register 330_1 and the number of second data renderer 130 events from the second shift register 330_2. The evaluator 340 first determines a sampling ratio between the first data renderer 120 and the second data renderer 130 The sampling frequency ratio is represented as $$\Delta(ti, T) = \left(\sum_{ti-T}^{ti}\left(\frac{Fs1}{N1}\right)\right) \bigg/ \left(\sum_{ti-T}^{ti}\left(\frac{Fs2}{N2}\right)\right).$$

The evaluator 340 calculates the first resampling factor K1$i$ using the formula K1$i$=1+(Δ(ti,T)−1)/2 and the second resampling factor K2$i$ using the formula K2$i$=1−(Δ(ti,T)−1)/2. K1$i$ and K2$i$ are updated every measurement interval ti. In some embodiments, the first resampling factor K1$i$ and the second resampling factor K2$i$ may be upsampled back to the Fs0 rate using the filter/upsampler 350 to generate the resampling factors K1' and K2', respectively.

In certain embodiments, the evaluator calculates the first phase adjuster φ1$i$ and the second phase adjuster φ2$i$ based on a comparison of the phase of the reference clock signal, the phase of the first feedback signal 174 and the phase of the second feedback signal 176. With reference to FIG. 1, the first delay element 184 and the second delay element 194 introduce a phase delay when adjusting the first sample rate and the second sample rate based on the first phase adjuster φ1$i$ and the second phase adjuster φ2$i$, respectively.

Figure 6:
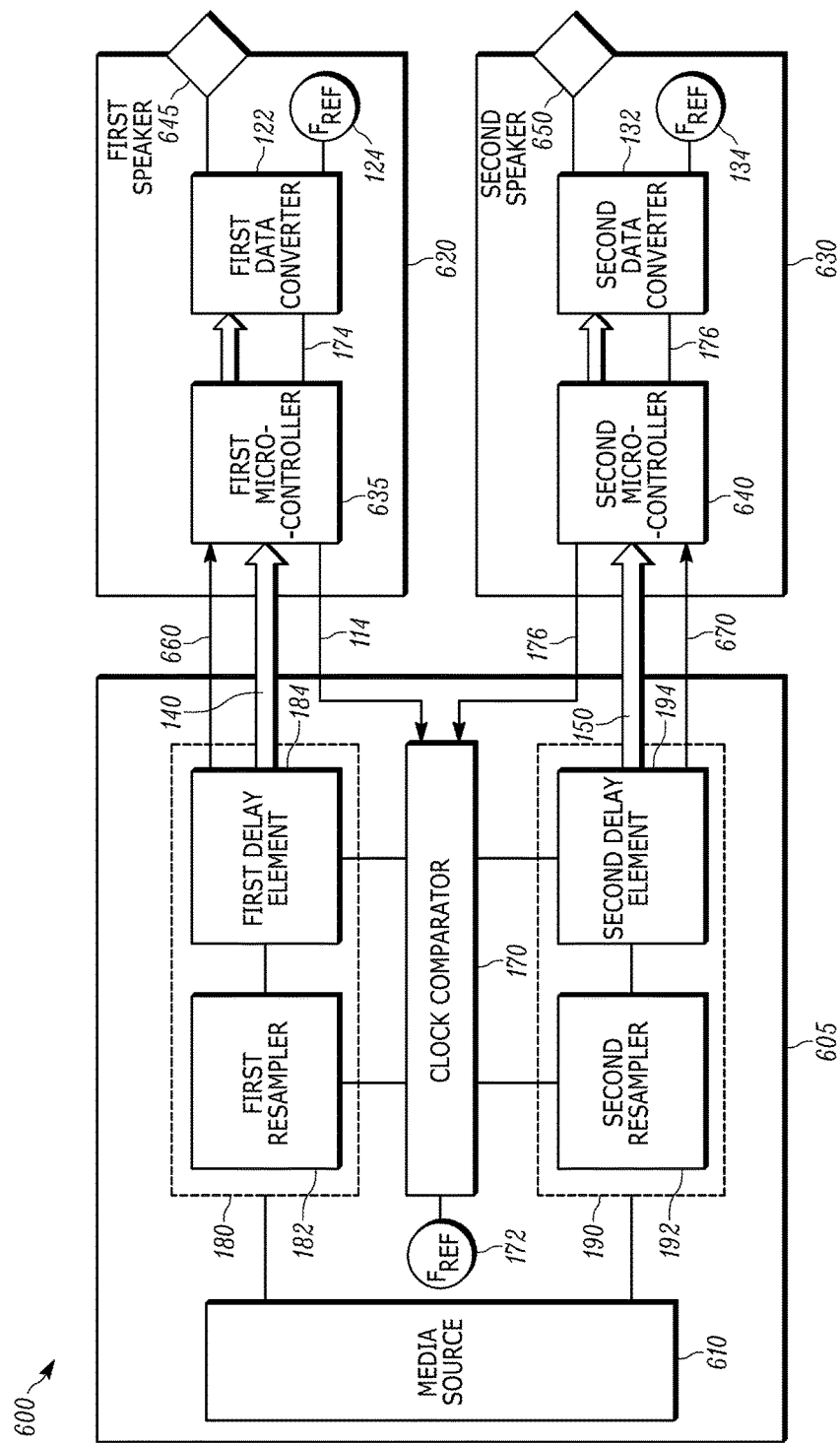
FIG. 6 is a block diagram of an alternative system for syntonized streaming in accordance with some embodiments.

FIG. 6 illustrates a media streaming system 600, which is an embodiment of the digital streaming system 100 of FIG. 1. Components of the media streaming system 600 sharing like numbers with components of the digital streaming system 100 as similar and perform similar functionality. The media streaming system 600 includes a media streaming device 605 having a media source 610. The media source 610 is similar to the data source 160 of FIG. 1 in that it provides a data stream. The data stream of the media source 610 is, in particular, a digital audio data stream. The media streaming system 600 further includes a first media renderer 620 and a second media renderer 630, which are similar to the first data renderer 120 and the second data renderer 130, but further include a first microcontroller 635 and a second microcontroller 640, respectively. Additionally, the first media renderer 620 and a second media renderer 630 include a first speaker 645 and a second speaker 650 as peripherals, respectively.

The media streaming system 600 is a multi-speaker wireless audio system providing wireless streaming of syntonized audio data from the media source 610 to the speakers 645 and 650. It should be understood that FIG. 6 illustrates only an exemplary embodiment of a media streaming system 600 and that the media streaming system 600 may include more or less components and may perform additional functions other than those described herein. For example, the media streaming system 600 may include additional media renderers, each with an associated resampling circuit in the media streaming device 605 and each providing a feedback signal to the clock comparator 170 for syntonization as described above.

Returning to the first media renderer 620, the first microcontroller 635 receives a digital audio data stream 660 over the first asynchronous data channel 140 from the media streaming device 605. The first microcontroller 635 provides the digital audio stream 660 to the first data converter 122, which then operates similar to as described above with respect to the digital streaming system 100. In particular, the first data converter 122 converts digital input to analog audio output that is provided to and output at the first speaker 645. The first data converter 122 also includes the buffer overflow pin that generates the first feedback signal 174, which is provided to the first microcontroller 635. The first microcontroller 635 transmits this first feedback signal to the media streaming device 605 over the first asynchronous data channel 140.

Similarly, the second microcontroller 640 receives a digital audio data stream 670 over the second asynchronous data channel 150 from the media streaming device 605. The second microcontroller 640 provides the digital audio stream 670 to the second data converter 132, which then operates similar to as described above with respect to the digital streaming system 100. In particular, the second data converter 132 converts digital input to analog audio output that is provided to and output at the second speaker 650. The second data converter 132 also includes the buffer overflow pin that generates the second feedback signal 176, which is provided to the second microcontroller 640. The second microcontroller 640 transmits this second feedback signal 176 to the media streaming device 605 over the second asynchronous data channel 150.

Although not illustrated, the media streaming device 605, first media renderer 620, and second media renderer 630 each include a known wireless communication circuit enabling the transmission and receipt of data, such as over the communication channels 140 and 150, as discuss herein.

In some embodiments, the media streaming system 600 streams media data other than or in addition to audio data, such as video data, to the first media renderer 620 and the second media renderer 630. The first media renderer 620 and the second media renderer 630 also include graphic displays (for example, a liquid crystal display (LCD) screen) for displaying the video data. In such embodiments, the media streaming system 600 provides wireless streamlining of syntonized video data from the media source 610 to the first media renderer 620 and the second media renderer 630.

Figure 7:
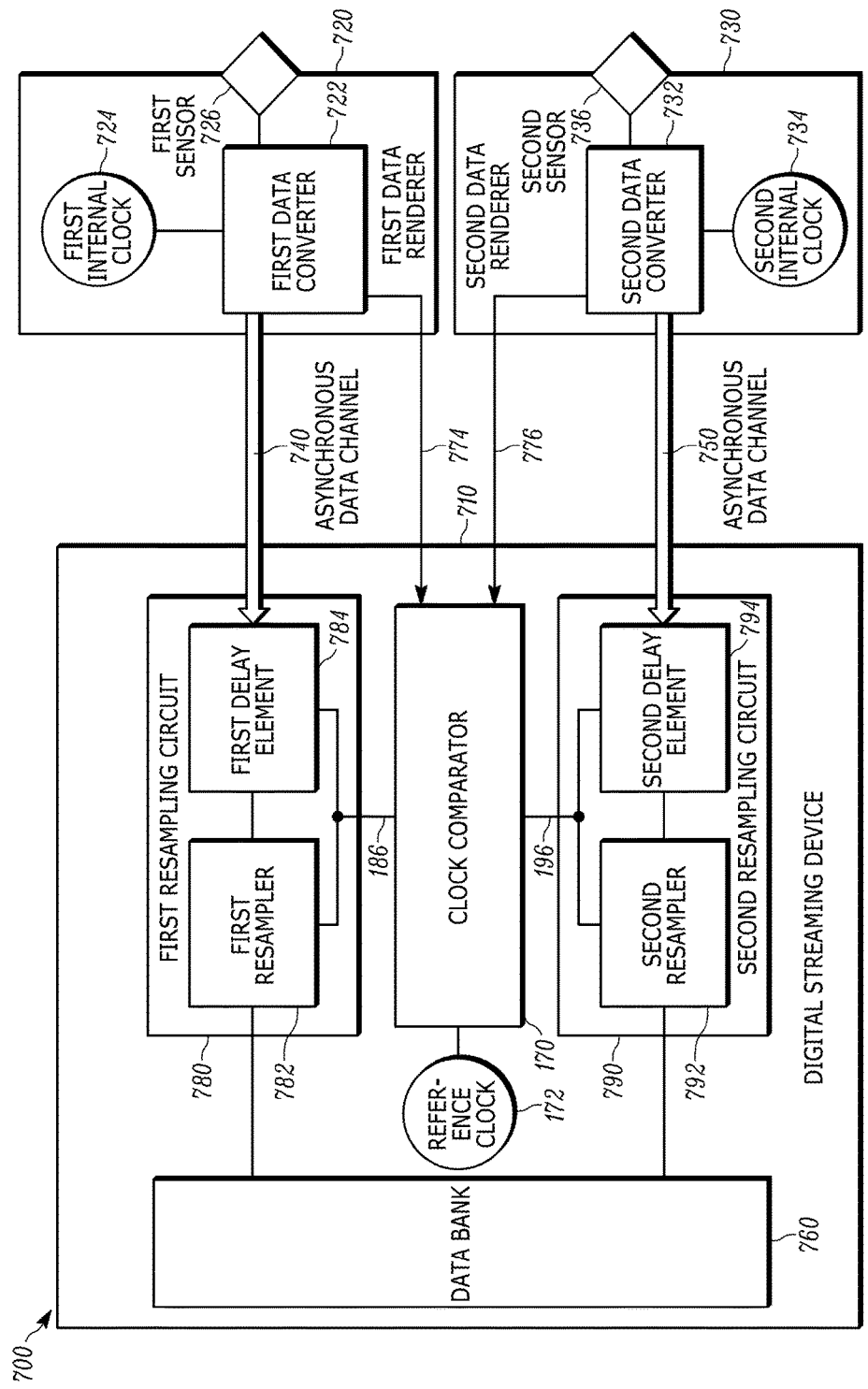
FIG. 7 is a block diagram of an alternative system for syntonized streaming in accordance with some embodiments.

FIG. 7 illustrates a sensor streaming system 700, which is an embodiment of the digital streaming system 100 of FIG. 1. The sensor streaming system 700 is a multi-sensor wireless sensing system that gathers and syntonizes sensed data wirelessly streamed from sensors of data gatherers. The sensor streaming system 700 includes a digital streaming device 710 receiving sensor data from a first data gatherer 720 and a second data gatherer 730 over a first asynchronous data channel 740 and a second asynchronous data channel 750, respectively. Accordingly, the direction of flow of streaming data in the sensor streaming system 700 is reversed relative to the digital streaming system 100. Components of the sensor streaming system 700 sharing like numbers with components of the digital streaming system 100 are similar and perform similar functionality. It should be understood that FIG. 7 illustrates only an exemplary embodiment of a sensor streaming system 700 and that the sensor streaming system 700 may include more or less components and may perform additional functions other than those described herein. For example, the sensor streaming system 700 may include additional data gatherers, each with an associated resampling circuit in the digital streaming device 710 and each providing a feedback signal to the clock comparator 170 for syntonization as described above.

The first data gatherer 720 includes a first data converter 722, a first internal clock 724, and a first sensor 726. The first data converter 722 receives analog sensor data from the first sensor 726 a clock signal from the first internal clock 724 for the operation of the first data gatherer 720. The first data converter 722 converts the analog sensor data into digital sensor data and transmits the sensor data over the first asynchronous data channel 740. The first data converter 722 includes a buffer overflow pin to generate a first feedback signal 774 when a buffer threshold event occurs. The first data gatherer 720 transmits the first feedback signal 774 to the digital streaming device 710.

The second data gatherer 730 includes a second data converter 732, a second internal clock 734, and a second sensor 736. The second data converter 732 receives analog sensor data from the second sensor 736 a clock signal from the second internal clock 734 for the operation of the second data gatherer 730. The second data converter 732 converts the analog sensor data into digital sensor data and transmits the sensor data over the second asynchronous data channel 750. The second data converter 732 includes a buffer overflow pin to generate a second feedback signal 776 when a buffer threshold event occurs. The second data gatherer 730 transmits the second feedback signal 776 to the digital streaming device 710.

The first sensor 726 and the second sensor 736 may be various types of analog sensors, such as a microphone, current sensor, temperature sensor, voltage sensor, optical sensor, and the like.

Although not illustrated, the digital streaming device 710, first data gatherer 720, and the second data gatherer 730 each include a known wireless communication circuit enabling the transmission and receipt of data, such as over the communication channels 740 and 750, as discuss herein.

The digital streaming device 710 includes a data bank 760, the clock comparator 170, a first resampling circuit 780 and a second resampling circuit 790. The first resampling circuit 780 includes a first resampler 782 and a first delay element 784. The first resampling circuit 780 resamples data received from the first data gatherer 720 and provides the data to the data bank 760. The second resampling circuit 790 includes a second resampler 792 and a second delay element 794. The second resampling circuit 790 resamples data received from the second data gatherer 730 and provides the data to the data bank 760. The clock comparator 170 generates resampling factors based on the first feedback signal 774 and the second feedback signal 776 in a similar manner as the clock comparator 170 generates resampling factors based on the first feedback signal 174 and the second feedback signal 176 as described with respect to the digital streaming device 110. The clock comparator 170 provides the resampling factors to the first resampling circuit 780 and the second resampling circuit 790 over the first factor line 186 and the second factor line 196, respectively. The first resampling circuit 780, in turn, adjusts the sample rate of the first data converter 722. Similarly, the second resampling circuit 790 adjusts the sample rate of the second data converter 732. Thus, the first resampling circuit 780 and the second resampling circuit 790 are similar in function to the first resampling circuit 180 and the second resampling circuit 190 except that the flow of data is reversed.

In some embodiments, syntonization of the data stream to data renderers (or from data gatherers, as the case may be) allows synchronization of data being output by the multiple data renderers (or captured by the multiple data gatherers), which may improve the quality of the data rendered (or captured). In some embodiments, syntonization of the data stream to the data renderers (or from the data gatherers, as the case may be) is achieved using the same in-band radio channel (such as Wi-Fi™ or Bluetooth™) over which data is streaming (for example, the asynchronous data channels 140, 150, 740, and 750). In other words, the feedback signals (for example, feedback signals 174, 175, 774, and 776) are provided on the same channel as the streaming data that is to be syntonized. This technique renders unnecessary out-of band channels or additional synchronization ports to syntonize the components, thereby reducing cost and equipment overload.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A digital streaming device for syntonized streaming comprising:
    a reference clock that generates a reference clock signal;
    a first data channel that communicates a data stream;
    a second data channel that communicates the data stream;
    a clock comparator electrically coupled to the reference clock and configured to:
        receive the reference clock signal,
        receive a first feedback signal for the first data channel,
        receive a second feedback signal for the second data channel, and
        generate a first syntonization signal based on the first feedback signal and the second feedback signal; and
    a first resampling circuit electrically coupled to the clock comparator and configured to adjust a first sample rate of the first data channel based on the first syntonization signal.

2. The digital streaming device of claim 1, wherein the first resampling circuit comprises:
    a first resampler to receive the data stream from a data source; and
    a first delay element electrically coupled to the first resampler to adjust a phase of the data stream.

3. The digital streaming device of claim 1, wherein the clock comparator is further configured to generate a second syntonization signal based on the first feedback signal and the second feedback signal, and further comprising a second resampling circuit electrically coupled to the clock comparator and configured to adjust a second sample rate of the second data channel based on the second syntonization signal.

4. The digital streaming device of claim 3, wherein the second resampling circuit comprises:

a second resampler to receive the data stream from a data source to adjust a frequency of the data stream; and a second delay element electrically coupled to the second resampler to adjust a phase of the data stream.

5. The digital streaming device of claim 1, wherein the first data channel communicates with a first media renderer and the second data channel communicates with a second media renderer.

6. The digital streaming device of claim 5, wherein the first feedback signal is based on a first buffer overflow pin of a first data converter of the first media renderer, and wherein the second feedback signal is based on a second buffer overflow pin of a second data converter of the second media renderer.

7. The digital streaming device of claim 5, wherein the first media renderer is a first speaker, and the second media renderer is a second speaker.

8. The digital streaming device of claim 1, wherein generating the first syntonization signal based on the first feedback signal and the second feedback signal comprises:

determining a first number of events in a time period from the first feedback signal;

determining a second number of events in the time period from the second feedback signal; and determining a ratio of the first number of events to the second number of events.

9. A method for syntonized streaming of data from a data source, the method comprising:

transmitting a data stream at a first data channel;

transmitting the data stream at a second data channel;

receiving, by a clock comparator, a reference clock signal from a reference clock;

receiving, by the clock comparator, a first feedback signal for the first data channel;

receiving, by the clock comparator, a second feedback signal for the second data channel;

generating, by the clock comparator, a first syntonization signal based on the first feedback signal and the second feedback signal; and adjusting, using a first resampling circuit, a first sample rate of the first data channel based on the first syntonization signal.

10. The method of claim 9, wherein adjusting the first sample rate of the first data channel further comprises resampling the data stream based on the first syntonization signal.

11. The method of claim 9, further comprising:

generating, by the clock comparator, a second syntonization signal based on the first feedback signal and the second feedback signal; and adjusting, using a second resampling circuit, a second sample rate of the second data channel based on the second syntonization signal.

12. The method of claim 11, wherein adjusting the second sample rate of the second data channel further comprises resampling the data stream based on the second syntonization signal.

13. The method of claim 9, wherein the first feedback signal is based on a first buffer overflow pin of a first data converter and the second feedback signal is based on a second buffer overflow pin of a second data converter.

14. The method of claim 9, wherein generating, by the clock comparator, the first syntonization signal based on the first feedback signal and the second feedback signal comprises:

determining a first number of events in a time period from the first feedback signal;

determining a second number of events in the time period from the second feedback signal; and determining a ratio of the first number of events to the second number of events.

* * * * *